United States Patent [19]

Young

[11] Patent Number: 4,906,062

[45] Date of Patent: Mar. 6, 1990

[54] INTEGRATED OPTICAL WAVEGUIDE BEND

[75] Inventor: Terence P. Young, Great Baddow, United Kingdom

[73] Assignee: The General Electric Company, p.l.c., London, United Kingdom

[21] Appl. No.: 264,349

[22] Filed: Oct. 31, 1988

[51] Int. Cl.$^4$ .............................................. G02B 6/12
[52] U.S. Cl. ............................... 350/96.12; 350/96.15
[58] Field of Search ............... 350/96.11, 96.12, 96.15, 350/96.16, 96.17

[56] References Cited

U.S. PATENT DOCUMENTS 4,810,049  3/1989  Fischer et al. ................... 350/96.12

*Primary Examiner*—John D. Lee
*Attorney, Agent, or Firm*—Spencer & Frank

[57] ABSTRACT

An integrated optic device comprises a strip-like waveguide having a Z-bend to provide a lateral offset. Weak lateral guiding in the waveguide is provided by giving the waveguide a higher effective refractive index than that of the remaining material in that layer. In accordance with the invention, an edge guide region is formed in the same layer just outside each bend, and has an even greater effective refractive index. The edge guide regions minimize power loss at the bends.

18 Claims, 5 Drawing Sheets

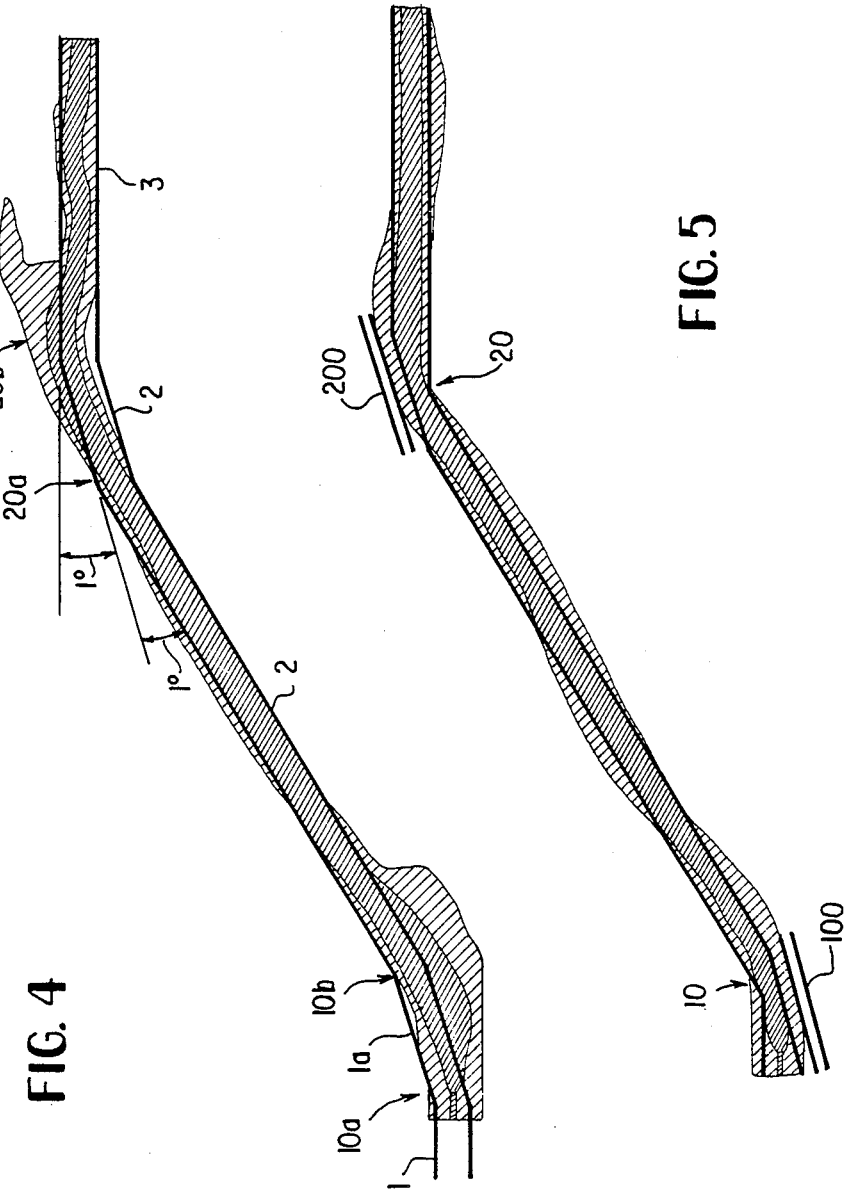

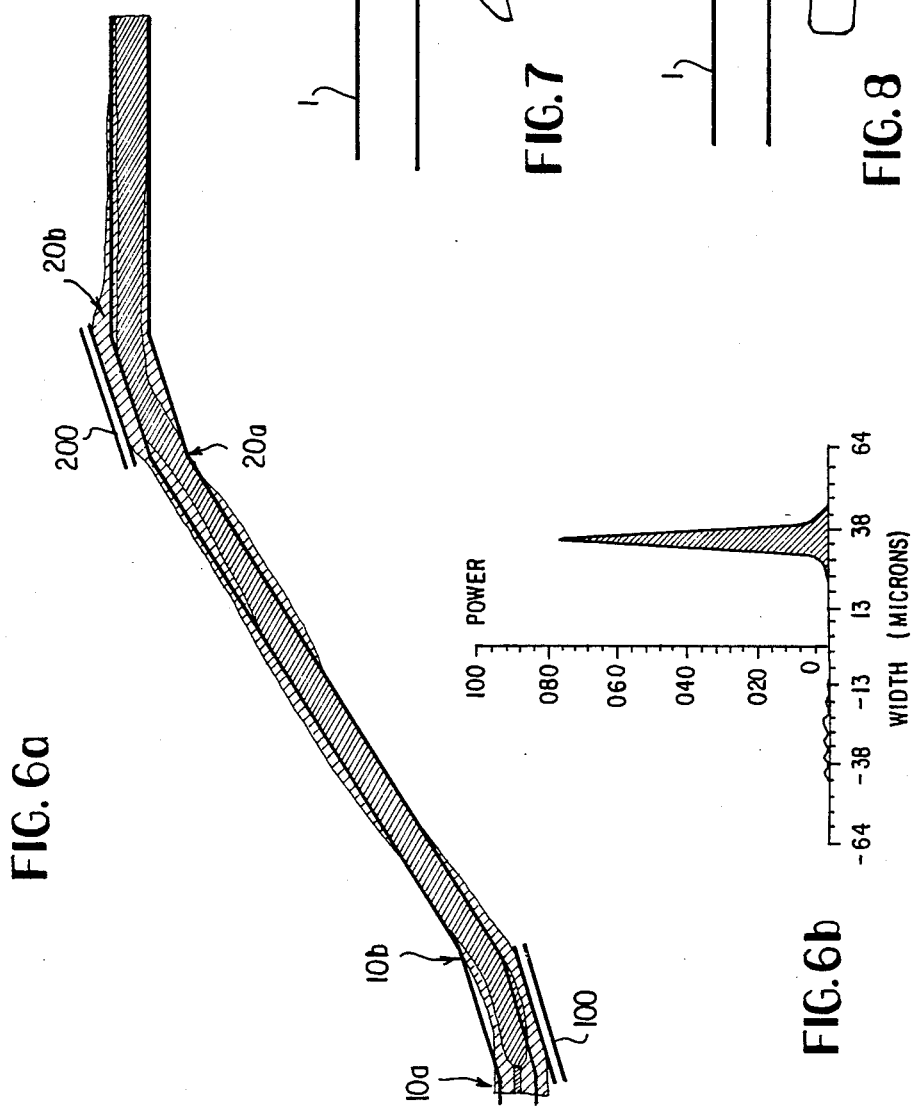

INTEGRATED OPTICAL WAVEGUIDE BEND

FIELD OF THE INVENTION

This invention relates to an integrated optic device comprising a strip-like waveguide having a bend in its own plane.

BACKGROUND OF THE INVENTION

One of the major problems to be solved in integrated optics lies in the area of waveguide bends. Waveguides must be able to corner in order to accommodate offsets in practical structures; the optimum packing of devices onto a substrate often requires the various devices to lie at differing angles relative to one another, and since such structures are typically long and thin it is necessary to provide large offsets or angular deviations over relatively short distances.

Waveguide structures vary in the degree to which they confine the light. In reasonably well-confined structures, such as titanium: lithium niobate guides, smooth curves have been used to reduce light power loss at bends, and proton exchange (PE) implants along the inner edges of the curves have been used to reduce bend radii considerably. The increased refractive index on the inside of the curves slows the wave down in these regions and re-orientates the phase front as the wave progresses around the bend. However, recent studies have shown that, for weakly-guided structures, in which transmission power losses are expected to be lower, simple S-shaped curves (composed of arc segments) can be as lossy as discrete bends. Recent research into weakly-guided structures, disclosed in "loss single-mode InP/InGaAsp waveguides grown by MOVPE", by P. W. A. McIlroy et al, Electron. Lett. 23 (13) pages 701–703 (1987), in which guaternary waveguides are formed on InP substrates, shows that structures which are tightly confined in the vertical direction (normal to the plane of the waveguide and of the substrate) with very weak lateral guiding have yielded the lowest scattering losses to date. The purpose of the present invention is to minimise power loss at bends in such waveguides, subject to the constraints of weak lateral guiding, and preferably without increasing the number of fabrication steps.

SUMMARY OF THE INVENTION

The invention provides an integrated optic device comprising an integrated optic waveguide of a first effective refractive index greater than that of a material or materials in which it is embedded to provide for the guiding of light along the waveguide, the waveguide having a bend in a principal plane, and an edge guide region, of a second effective refractive index also greater than that of the surrounding material or materials positioned in the principal plane adjacent the outside of the bend such as to decrease the light loss from the waveguide which would otherwise occur at the bend without the edge guide region.

In this specification, the term "effective refractive index" has the meaning defined in: "Integrated Circuits for the Millimetre Wave through Optical Frequency Range", R. M. Knox and P. P. Toulios, Proc. Symp. on Submillimetre Waves, Brooklyn, New York, Polytechnic Press, pages 497–516 (1970). Briefly, the effective refractive index is that of a two-dimensional complex structure when view in one dimension only; in this case, the effective refractive index of parts of the device is that obtained when the device is viewed in a direction normal to the principal plane.

Surprisingly, the effectiveness of the edge guide region at reducing power loss at the bend is greatest if the said second effective refractive index is greater than the first effective refractive index. The surprising ability of the edge guide region to resist the coupling of light and thus to confine the light to the bend (and possibly also to a gap between the bend and the edge guide region) appears to derive from some form of directional coupling under extreme $\Delta\beta$; because of the phase mismatch, very little light couples into the edge guide region. The light-confining effect appears to be largely destroyed when the edge guide region is made too wide in the said plane, and accordingly the edge guide region is preferably of such a narrow width that it cannot support multi-mode transmission of light at the wavelengths for which the waveguide is appropriate. The edge guide region is preferably strip-like, and preferably of a width less than but of the order of the waveguide width.

BRIEF DESCRIPTION OF DRAWINGS

In order that the invention may be better understood, some examples of its embodiment will now be described, and their properties will be compared with those of corresponding previous devices which do not incorporate the invention. In this description, reference is made to the accompanying diagrammatic drawings, in which:

FIG. 1b is a graph of the power distribution of the light exiting from the waveguide of FIG. 1a, taken on the line b—b of FIG. 1a;

FIG. 1c indicates the power distribution taken along the line c—c of the light entering the waveguide of FIG. 1a;

FIG. 4 shows a known waveguide similar to that of FIG. 1a but having two pairs of coupled bends instead of the two abrupt bends;

FIG. 5 shows a waveguide similar to that of FIG. 3a but provided with edge guide regions in accordance with the invention at each chamfered bend;

FIG. 6a shows a waveguide similar to that of FIG. 4 but provided at each pair of coupled bends with an edge guide region in accordance with the invention;

FIG. 6b illustrates the improved power distribution along a line corresponding to the line b—b of FIG. 1a on the waveguide of FIG. 6a, given an input power distribution as shown in FIG. 1c; and FIGS. 7 and 8 show, to an enlarged scale, alternative configurations of an edge guide region for a waveguide bend.

DESCRIPTION OF PREFERRED EMBODIMENTS

Figure 1B:
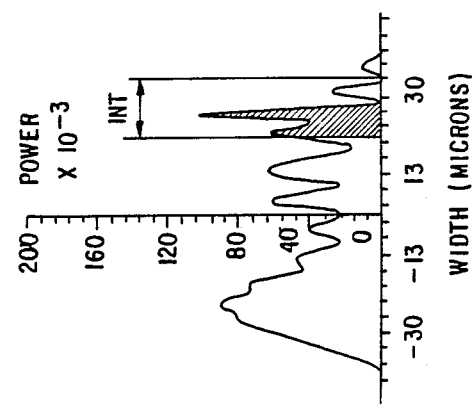

The waveguides illustrated comprise two opposite bends sufficient to provide an offset, transverse to the lengthwise direction, of 70 microns over a length of 2000 microns. The waveguides are 7 microns wide and each bend, or pair of coupled bends, subtends an angle of 2°. The overall integrated optic device comprises a substrate (20, FIG. 2) of indium phosphide of n+ doping superimposed with a cladding layer (21, FIG. 2) of indium phosphide with n-doping. A thin guiding layer 22 of quaternary material, such as indium gallium arsenide phosphide, overlies the n-cladding layer, and a substrate 23 of the indium phosphide with n-doping is superimposed on the quaternary guiding layer. The quaternary layer, whose refractive index may for example be 3.38, is sandwiched between the layers of indium phosphide with n-doping whose refractive index may be for example 3.17. This provides a relatively strong confinement of optical waves in the quaternary layer.

To confine the optical wave relatively weakly in the strip (22a, FIG. 2) of the quaternary guiding layer 22 which constitutes the waveguide, corresponding strips 24 of quaternary material are formed over the main quaternary layer 22 in place of the indium phosphide n-superstrate material. The thickness t of the strips of quaternary material and the narrow "etch stop" spacing e between the strips 24 and the main quaternary layer 22 determine the effective refractive index $n_{ew}$ of the waveguide: thicker overlying layers of quaternary material give rise to higher effective refractive indices. In this example, a 2-tier pattern (24,26; 25 (FIG. 2)) of quaternary material overlies the main quaternary layer. Where the main quaternary layer 22 is overlain by the indium phosphide superstrate layer alone it has an effective refractive index $n_{es}$ of 3.29437; where it is overlain by the lower tier 24,26 only of the quaternary material it has a first effective refractive index $n_{ew}$ of 3.29437+0.00164=3.29601 and where it is overlain by both tiers 25,26 of the quaternary material, it has a second effective refractive index $n_{ee}$, substantially greater than the first, of 3.29437+0.016=3.31037.

Figure 1A:
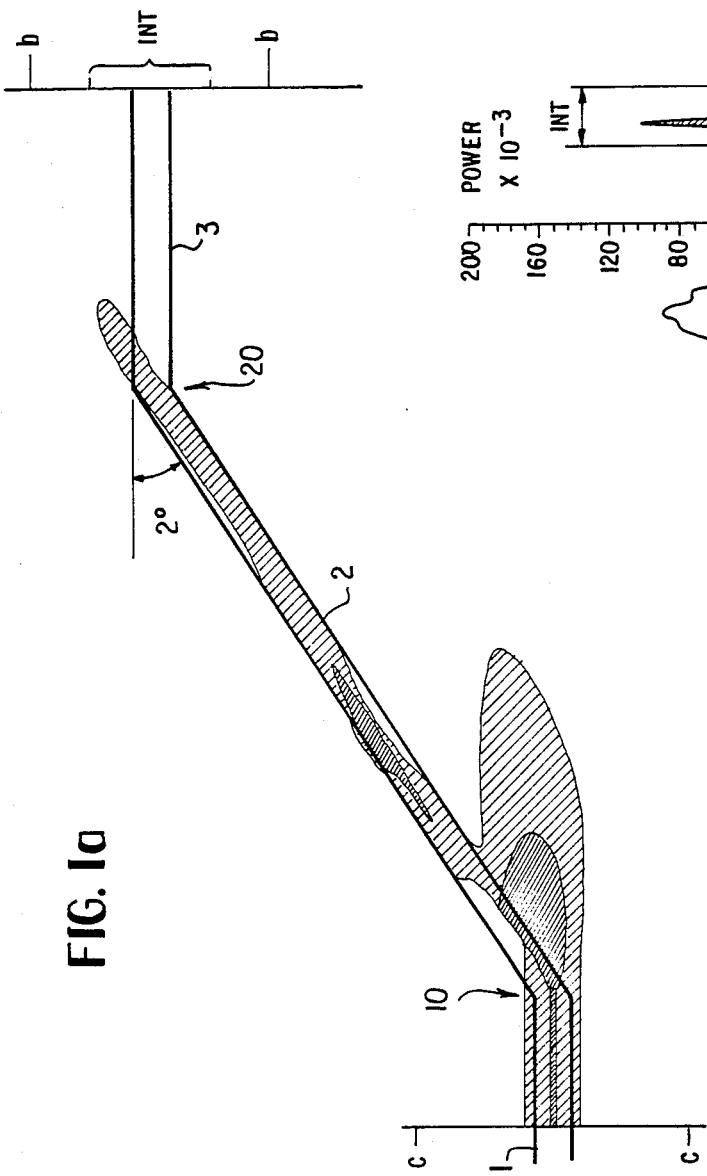
FIG. 1a is a diagram of a known waveguide having two abrupt bends, the aspect ratio being greatly exaggerated, and in which the intensity of light entering the left-hand bend of the waveguide is represented by the weight of the shading of different regions of the waveguide and of the surrounding structure.
Figure 1C:
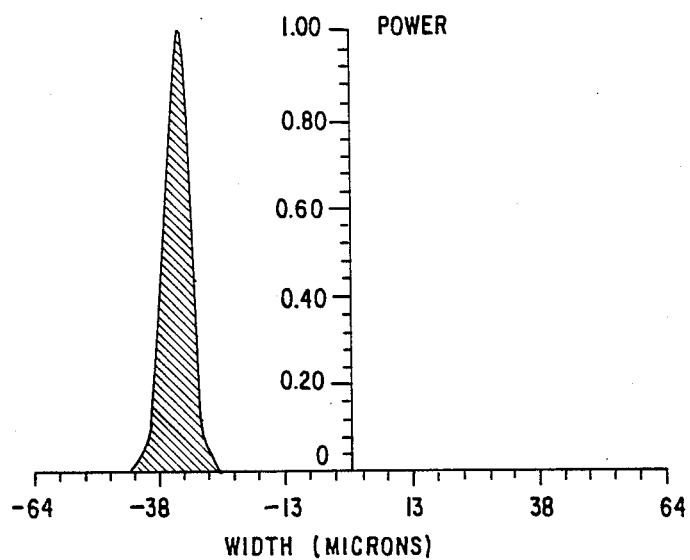

As shown in FIG. 1a, a conventional waveguide with two abrupt bends 10,20 comprises two parallel portions 1,3 joined by an intermediate portion 2 inclined at 2°. A light beam of the power distribution shown in FIG. 1c is applied across the device across the line c—c of FIG. 1a, and the measured output power along the line b—b of FIG. 1a is shown in FIG. 1b. A crude indication, obtained in two dimensions only (using the beam propagation method), of the power distribution in the illustrated portion of the device is illustrated in the form of shading in FIG. 1a, in which heavier-shaded regions represent regions of greater light intensity. It will be appreciated from FIG. 1a that substantial power loss occurs at both bends.

In order to provide a basis for the comparison of different waveguides and their ability to contain the light, the power distribution is integrated in the transverse section b—b over the region close to the waveguide labelled "INT" in FIGS. 1a and 1b. The value of the integration is represented as the shaded area under the graph of FIG. 1b. This integrated value, representative of the total power loss, is expressed as a fraction of the input power in terms of decibels (dB) in Table 1 below. As indicated in the Table, the wavelength of the light used in all the tests described was 1.55 microns.

TABLE I

Figure 3A:
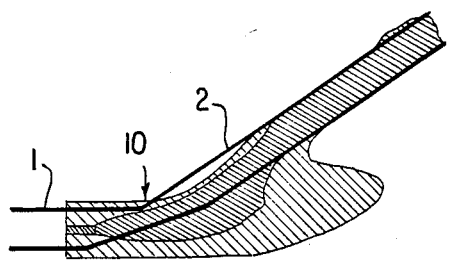
FIG. 3a shows a single bend in a known waveguide similar to that of FIG. 1a but provided with a chamfer.

| FIG. No. | Geometry | Total powerloss (dB) at wavelength of 1.55 μm |
|---|---|---|
| 1a | Two abrupt bends: 7 μm guide | 9.16 |
| 3a | As FIG. 1a, with 400 μm chamfer | 5.20 |
| 4 | As FIG. 1a, with coupled bends | 3.29 |
| 5 | As FIG. 3a, with edge guides | 1.66 |
| 6a | As FIG. 4, with edge guides | 1.12 |

Figure 3B:
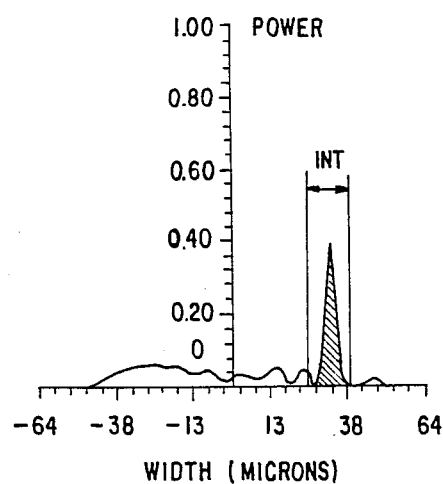
FIG. 3b illustrates the power distribution at a position corresponding to b—b of FIG. 1a in a waveguide having two abrupt bends of the form shown in FIG. 3a, arising from input light of the power distribution of FIG. 1c.

It has recently been disclosed that chamfering the outside edge of a bend reduces light loss, and this is illustrated in the waveguide of FIGS. 3a and 3b. As shown in Table 1, this gives a dramatic improvement in power loss.

It has also been discovered that power loss may be reduced substantially by replacing a single ben (10;20) with a pair (10a and 10b; 20a and 20b) of coupled bends, as shown in FIG. 4. If the spacing 1a,2a between the coupled bends is selected correctly, such that the phase front of the light is tilted in exactly the right direction when the second bend is encountered, much less light is lost than is the case with a single bend, as shown in Table I.

Figure 2:
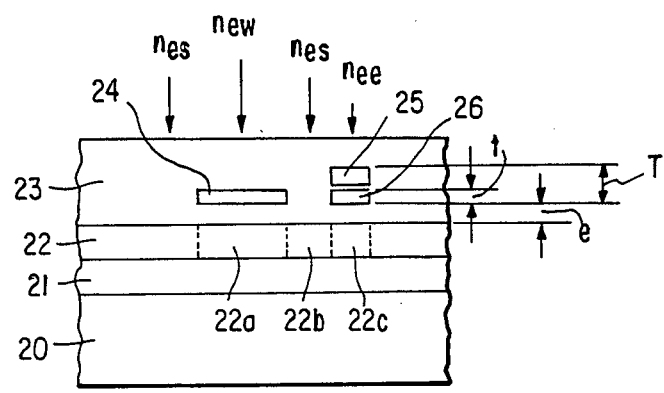
FIG. 2 is a section, drawn to an enlarged scale, through a waveguide embodying the invention in the region of a bend, the section being taken normal to the principal plane in which the waveguide bends, and normal to the waveguide.

The invention is first illustrated in FIG. 5, in which two edge guide regions 100, 200 are positioned in the plane of the waveguide adjacent to the outside of each bend. The cross-section through the waveguide at a bend is shown diagrammatically in FIG. 2. The waveguide of FIGS. 2 and 5 is otherwise identical to that of FIG. 3a, each bend being provided with a 400 micron chamfer. As shown in Table I, a dramatic improvement is found in limiting the power loss, which can only be attributed to the presence of the edge guide regions. Each edge guide region 100,200 (22c, FIG. 2) forms part of the main quaternary layer 22, overlain by both tiers 25,26 of the extra quaternary material, so that its effective refractive index $n_{ee}$, the so called second effective refractive index, is substantially greater than the effective refractive index $n_{ew}$ of the waveguide, which is overlain by only the lower tier 24. Thus the effective refractive index of the edge guide regions exceeds that of the waveguide which in turn exceeds that of the remainder of the quaternary layer in the same plane.

As illustrated in FIG. 2 and 5, a space 22b is provided in the quaternary layer between the waveguide and the edge guide region. In this example, the edge guide region is a rectangular strip 2 microns wide with a space of 3 microns from the waveguide. The edge guide region extends lengthwise of the waveguide over a distance of the order of the length of the chamfer, parallel to the chamfer.

FIG. 6a illustrates the use of edge guide regions 100,200 on the waveguide of FIG. 4, with two pairs of coupled bends 10a,10b and 20a,20b. This configuration, as shown in Table I, provides the best performance, giving rise to the power distribution shown in FIG. 6b.

It will be appreciated that the configuration of the edge guide region may take many forms other than a simple rectangle. Further, it may not be essential to provide a space between the edge guide region and the waveguide. Examples of alternative configurations are shown in FIGS. 7 and 8. FIG. 8 shows one example of an edge guide region which follows the contour of the bend.

In integrated optic devices which already use a 2-tier structure superimposed on a substrate, to provide regions of different effective refractive indices, the provision of edge guide regions 100,200 etc. for the various waveguides will not necessitate any extra fabrication steps. One particular example is the 2-mode interferometer in which the pairs of input and output channels have lower effective refractive indexes than the common central channel. Such devices are formed by the selective removal of one or both tiers of the 2-tier structure, using conventional etching techniques, and/or by the selective deposition of such layers.

Even if the high effective refractive index of the edge guide regions causes high power losses, these losses will occur only over a relatively short length since there is no need for the edge guide regions to be any longer than is necessary to cover the waveguide bends, for example the length of a chamfer on the length of the waveguide portion between coupled bends.

In this example, the waveguides and any other portions of the quaternary layer which are overlain by only one further layer of quaternary material, have an effective refractive index which is 0.00164 greater than that of the remainder of the quaternary layer, and the edge guide regions, and any other portions of the quaternary layer which are overlain by both extra layers of quaternary material, have an effective refractive index which is 0.016 greater. Thus the refractive index difference is approximately ten times greater for the edge guide regions than it is for the waveguides. However, ratios other than 1:10 are envisaged, for example ratios of from 1:2 to 1:20; edge guide regions could even be effective if they have the same effective refractive index as that of the waveguide, i.e. with a ratio of 1 to 1.

Although the invention has been illustrated with strip-like waveguides in which light propagates in a very thin, flat channel, the invention is applicable to integrated optic waveguides of other configurations, such as channels formed in Lithium Niobate.

I claim:

1. An integrated optic device comprising an integrated optic waveguide of a first effective refractive index greater than that of a material or materials in which it is embedded to provide for the guiding of light along the waveguide, the waveguide having a bend in a principal plane, and an edge guide region of a second effective refractive index also greater than that of the surrounding material or materials positioned in the principal plane adjacent to the outside of the bend such as to decrease the light loss from the waveguide which would otherwise occur at the bend without the edge guide region.

2. An integrated optic device according to claim 1, wherein the waveguide defined as a strip of a layer of material formed in the principal plane on a substrate, the refractive index of the layer being greater than that of the substrate, the said strip being overlain by a corresponding strip of a confining medium which gives the waveguide its said effective refractive index greater than that of the remainder of the layer.

3. An integrated optic device according to claim 2, wherein the edge guide region is defined as a portion of the said layer overlain by a corresponding portion of a confining medium which gives the edge guide region its said second effective refractive index greater than that of the remainder of the layer.

4. An integrated optic device according to claim 3, wherein the said confining media overlying the edge guide region and the waveguide are part of a 2-tier pattern formed on the said layer, the edge guide region being overlain by portions of both tiers and the waveguide being overlain by a portion of only the lower tier.

5. An integrated optic device according to claim 4 comprising at least one further structure on the same substrate, the structure comprising a channel overlain by a portion of only the lower tier pattern and an associated channel overlain by a portion of both tiers of the pattern.

6. An integrated optic device according to claim 5, wherein the further structure is a 2-mode interferometer.

7. An integrated optic device according to claim 2, comprising a space in the said layer between the waveguide and the edge guide region.

8. An integrated optic device according to claim 7, wherein the width of the space is of the order of the width of the edge guide region.

9. A method of manufacturing an integrated optic device in accordance with claim 2 in which the waveguide is defined by the selective removal of portions of the layer or layers formed on the substrate.

10. An integrated optic device according to claim 1 wherein the second effective refractive index is greater than the first effective refractive index.

11. An integrated optic device according to claim 1, wherein the said bend is chamfered on the outside.

12. An integrated optic device according to claim 11, wherein the edge guide region extends lengthwise of the waveguide over a distance of the order of the length of the chamfer.

13. An integrated optic device according to claim 1, comprising a series of two bends in opposite directions, each with a corresponding edge guide region positioned on the outside.

14. An integrated optic device according to claim 1, wherein the or each edge guide region generally follows the contour of the outside edge of the bend of the waveguide.

15. An integrated optic device according to claim 1, wherein the or each edge guide region is generally strip-like.

16. An integrated optic device according to claim 1, wherein the or each edge guide region is sufficiently narrow that it cannot support multimode light transmission.

17. An integrated optic device according to claim 1, wherein the or each edge guide region is narrower than the waveguide.

18. An integrated optic device according to claim 1, wherein the or each edge guide region is of the order of the width of the waveguide.

* * * * *